United States Patent
Shang

(10) Patent No.: US 6,812,429 B2
(45) Date of Patent: Nov. 2, 2004

(54) SBB MACHINE AND METHOD FOR HGA MASS PRODUCTION

(75) Inventor: Ping Shang, Dongguan (CN)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 0 days.

(21) Appl. No.: 10/682,428

(22) Filed: Oct. 10, 2003

(65) Prior Publication Data

US 2004/0074879 A1 Apr. 22, 2004

Related U.S. Application Data

(63) Continuation of application No. 10/058,166, filed on Jan. 25, 2002, now Pat. No. 6,660,961.

(30) Foreign Application Priority Data

Oct. 11, 2001 (CN) ................................. PCT/CN01/01475

(51) Int. Cl.[7] .......................... B23K 1/005; B23K 26/20
(52) U.S. Cl. .................................. 219/121.64; 228/175
(58) Field of Search ..................... 219/121.6, 121.63, 219/121.64, 121.65, 121.66, 121.82, 121.85; 228/175, 254

(56) References Cited

U.S. PATENT DOCUMENTS

| 5,631,786 A | * | 5/1997 | Erpelding | ................ 360/97.01 |
| 5,828,031 A | * | 10/1998 | Pattanaik | ................ 219/121.63 |
| 6,046,882 A | * | 4/2000 | Pattanaik et al. | ............. 29/878 |
| 6,097,087 A | * | 8/2000 | Farnworth et al. | .......... 257/698 |
| 6,380,511 B1 | * | 4/2002 | Santhanam | ............ 219/121.64 |

* cited by examiner

Primary Examiner—Samuel M. Heinrich
(74) Attorney, Agent, or Firm—Kenyon & Kenyon

(57) ABSTRACT

This invention relates to an SBB machine and method used in a magnetic head assembly process of HGA production for hard disk drives. The SBB comprises a laser head with a focus system, a monitor with a camera positioning system and a flex cable sheet station with a conveyer system. The laser head can be controlled from the monitor to move vertically and horizontally by the camera positioning system, and the conveyer belt of the transport system can be controlled to move step by step.

1 Claim, 5 Drawing Sheets

SBB MACHINE AND METHOD FOR HGA MASS PRODUCTION

RELATED APPLICATIONS

This application is a continuation of U.S. Ser. No. 10/058,166 filed Jan. 25, 2002, now U.S. Pat. No. 6,660,961.

TECHNICAL FIELD OF THE INVENTION

The invention relates to a solder ball bounding (SBB) machine and method used in a magnetic head assembly process of HGA production for hard disk drives.

BACKGROUND OF THE INVENTION

U.S. Pat. No. 5,828,031 entitled "Head Transducer to Suspension Lead Termination by Solder Ball Place/Reflow" issued to Surya Pattanaik on Oct. 27, 1998 discloses a method for forming electrical solder connection between a thin film magnetic head transducer and the conductors in an integrated suspension after the head has been mechanically attached to a suspension. A solder ball is placed between the head and conductor termination pads. A focused laser beam is used to produce solder reflow. The resulting solder connection has a very fine grain structure and includes a pair of extremely thin layers of intermedallic compounds in the regions where the solder connection abuts the head and conductor termination pads.

FIG. 1 shows a conventional SBB (solder ball bounding) bond head. As shown in FIG. 1, the SBB bond head has a capillary 2 on its laser head 1 through which the laser beam and the solder ball 3 get to the bump 4 desired. When the laser is turned on, the solder ball 3 will be melt on the bump and the welding finished.

FIG. 2: shows a top view of a head area of an HGA (head gimbal assembly). As shown in FIG. 2, the HGA comprises a slider 24 and a suspension 21 which has a flexure 22 and a flex cable 26 thereon. There are some traces 23 on the flex cable 26 as a signal channel. And there are some bump pads 27 on the slider 24. Usually the slider 24 is bounded on a tongue area 28 of the flexure 22, and is well alignment to a pad 25 of the trace 23 of the flex cable 26.

To derive a signal from the slider 24, it is needed to connect the bump pad 27 of the slider 24 to the bump pad 25 of the trace 23 by an SBB or other bonding method.

A conventional bonding method for an HGA comprises steps as follows:
1. mounting a flex cable 26 on a suspension 21;
2. mounting a slider 24 on the suspension 21;
3. loading the suspension 21 to a fixture 33 in FIG. 3;
4. connecting a pad 25 of a trace 23 with a slider pad 27 on the suspension 21 by an SBB or GBB (gold ball bonding) bonding method; and
5. taking the HGA from the fixture 33, then loading another suspension to the fixture 33, repeating steps 1–4 for bonding a next HGA.

There are three problems in a conventional bonding process by means of a conventional bonding machine as shown in FIG. 3:

1. In order to fix a suspension 21 and a slider 24 in the bonding process, two clamps 31 and 32 as well as a fixture 33 are provided. Consequently, it will be possible to cause damage to the suspension 21.
2. Since the SBB is a kind of heating process by laser power, it is likely to produce a internal stress in the flexure made of metal when bonding a slider to a flexure, which will cause a suspension static pitch/roll change.
3. Since bonding is made at an HGA level, only one HGA can be bonded every time. Therefore, the mass production is difficult, and the efficiency of production is very low.

SUMMARY OF THE INVENTION

In order to overcome the above-mentioned drawbacks, it is necessary to change the bonding process from an HGA level to a flex cable level and to add a flex cable sheet convey system to a bonding machine.

Therefore, one object of the present invention is to provide an SBB machine used in a magnetic head assembly process of HGA production.

Another object of the present invention is to provide an SBB method by means of the machine.

In one aspect of the present invention, an SBB machine comprises a laser head with a focus system, a monitor with a camera positioning system and a flex cable sheet station with a conveyer system. The laser head can be controlled from the monitor to move vertically and horizontally by the camera positioning system, and the conveyer belt of the transport system can be controlled to move step by step.

In another aspect of the present invention, A SBB bonding method for an HGA by means of the SBB machine according to the present invention comprises steps:
a) making a flex cable trace pattern on a flex cable sheet by etching or the like;
b) bonding sliders the number of which corresponds to that of the flex cables on the flex cable sheet by SBB or the like, with precise alignment to trace pads one by one;
c) cutting the flex cable provided with the sliders from the flex cable sheet;
d) mounting the flex cable provided with the sliders onto a suspension by epoxy or the like, and finishing an HGA.

BRIEF DESCRIPTION OF THE DRAWINGS

The objects and features of the present invention will become more apparent from consideration of the following detailed description taken in conjunction with the accompanying drawings, in which.

DETAILED DESCRIPTION OF THE PREFERRED EMBODIMENTS

The present invention will now be described by way of examples with reference to the accompanying drawings.

Figure 6A:
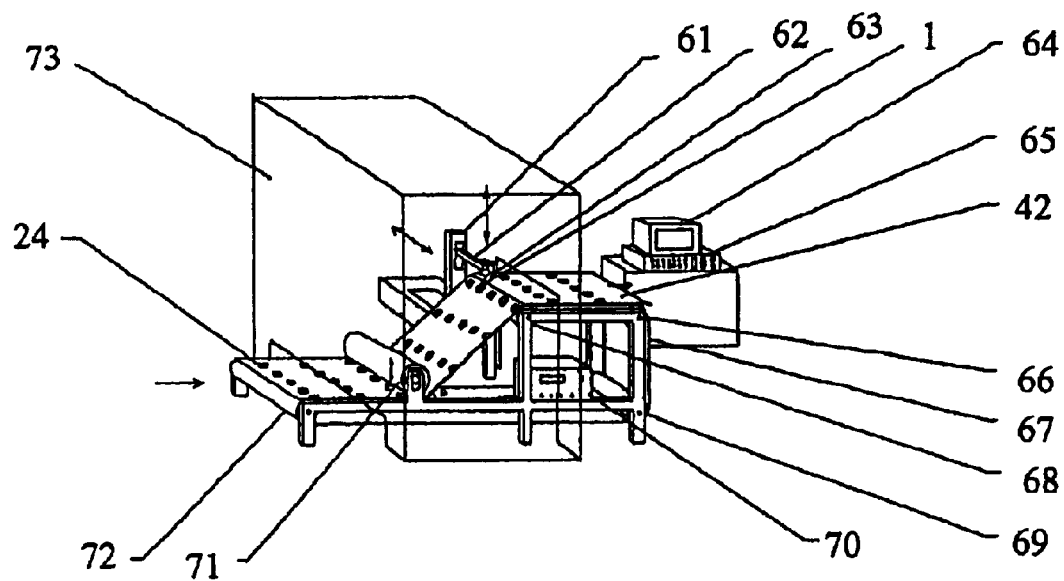
FIG. 6A shows a diagram of an SBB machine with a flex cable sheet conveyer system, according to the present invention.

First of all, refer to FIG. 6A which shows a diagram of an SBB machine with a flex cable sheet conveyer system, according to the present invention. As shown in FIG. 6A, the SBB machine of the present invention comprises a laser head 1, a suspension 21, a flex cable sheet 42, a post 61, an arm 62, a camera 63 mounted on the arm 62 together with the laser head 1, a monitor 64, a controller 65 for the laser head 1 and a controller 70 for a conveyer system including a conveyer roller 71 and four corner rollers 66, 68, 69 and 72. Under the control of the controller 65 and from a picture displayed on the monitor 64, the laser head 1 mounted on the arm 62 can move together with the camera 63 vertically and/or horizontally along the post 61 and/or the arm 62. The conveyer roller 71 of the conveyer system controlled by the controller 70 can rotate and move vertically so that the flex cable sheet 42 can move step by step along the peripheral surfaces of the corner rollers 66, 68, 69 and 72.

Figure 6B:
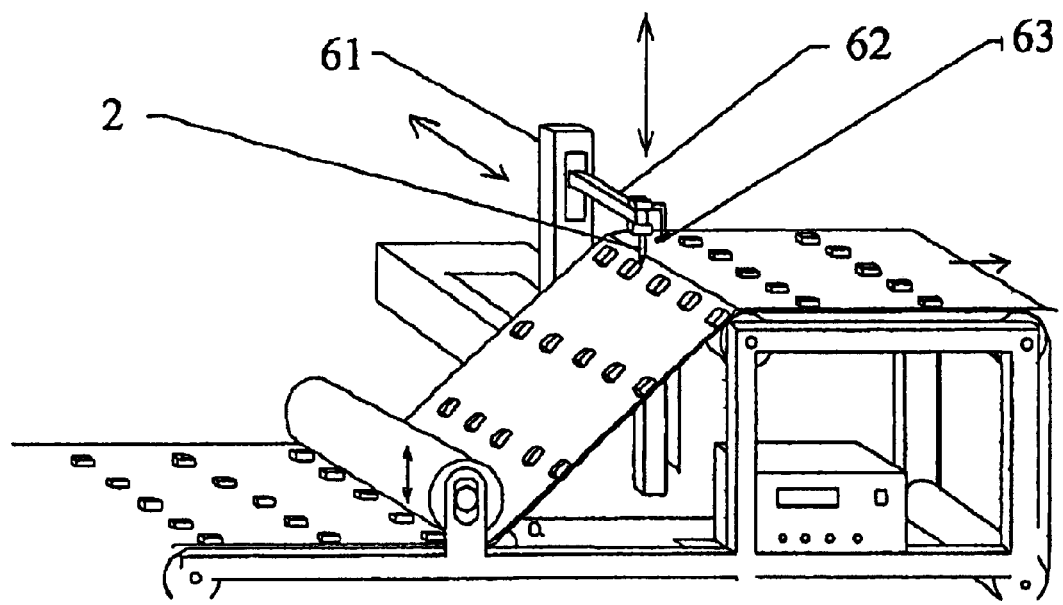
FIG. 6B shows details of a laser bonding area in FIG. 6A.

The conveyer system can carry the flex cable sheet 42 with an angle α with respect to the horizontal level to the laser head station, as shown in FIGS. 6A and 6B, with α being within the range of 0–90 degrees, so that it is liable for a bonding capillary to touch a bonding pad area of a slider.

Figure 1:
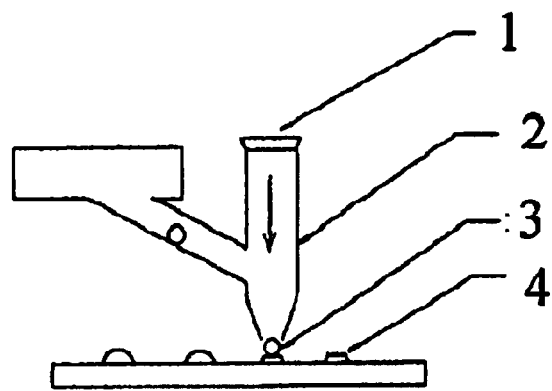
FIG. 1 shows a diagram of a conventional SBB head.
Figure 2:
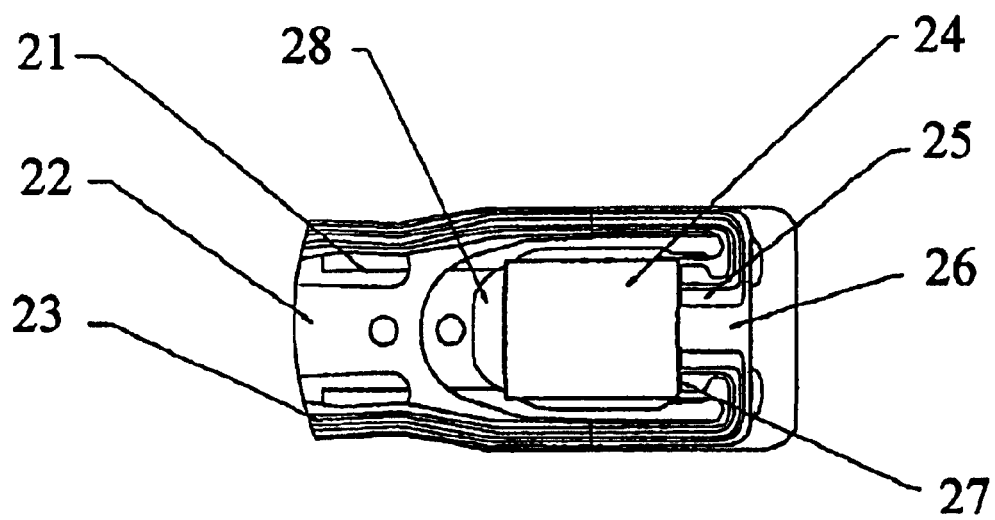
FIG. 2 shows a diagram of an HGA head area.
Figure 3:
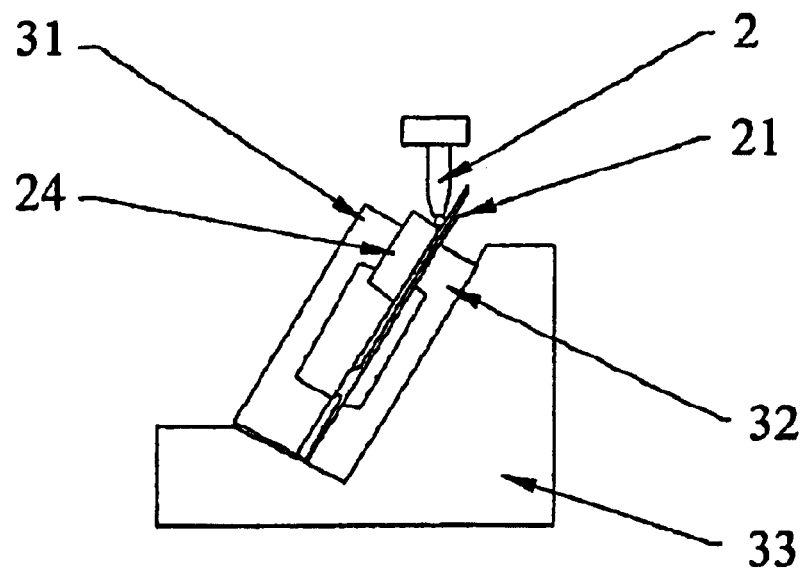
FIG. 3 shows a conventional bonding process of an SBB machine for HGAs.
Figure 4:
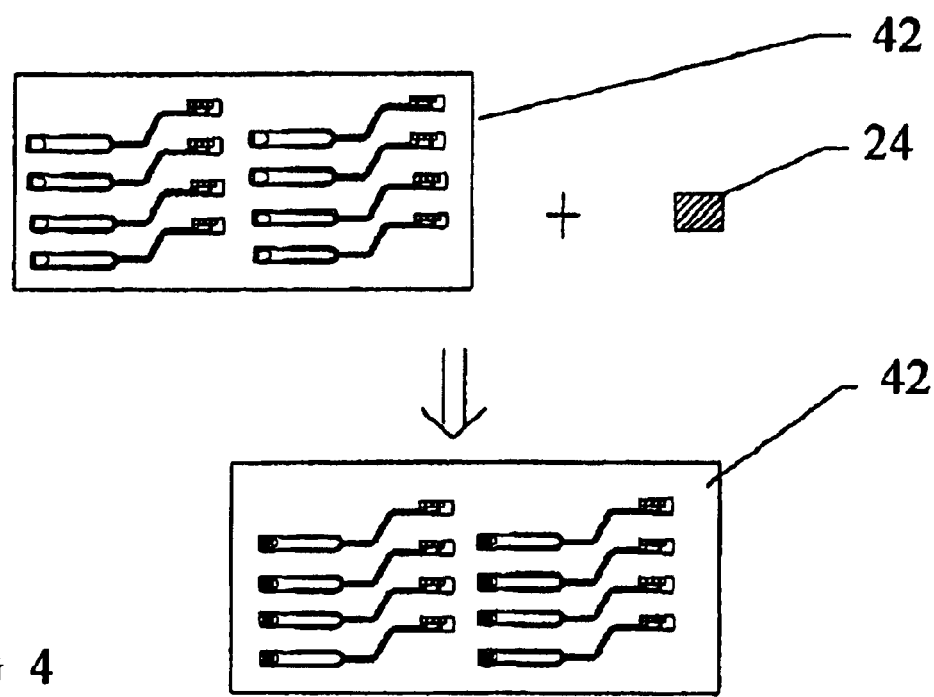
FIG. 4 shows a step of mounting sliders on the flex cable sheet in an SBB method according to the present invention.
Figure 5:
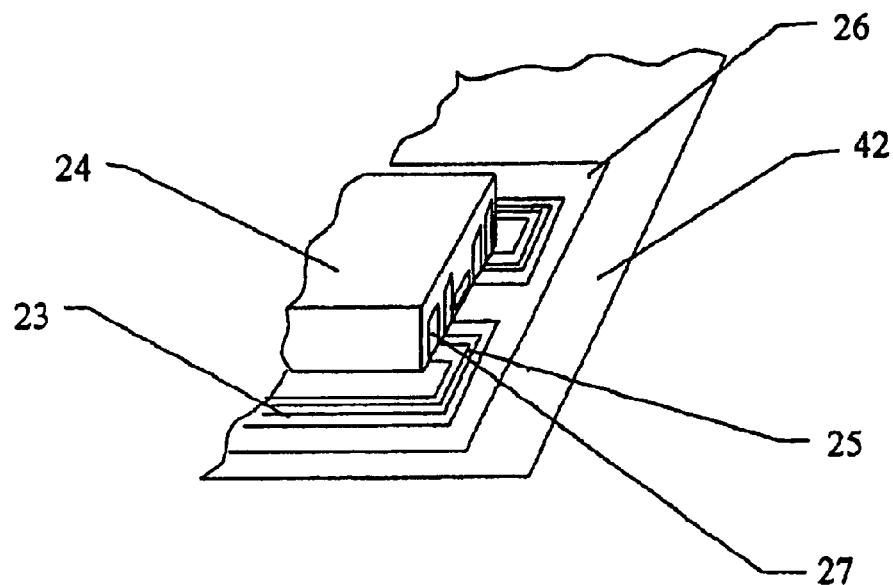
FIG. 5 shows details of a pad area in the mounting status in FIG. 4.

Furthermore, an example of an SBB method of the present invention will be described with reference to FIGS. 4 and 5.

Firstly, a flex cable trace pattern 26 is made on a flex cable sheet 42 by etching or the like.

Secondly, sliders are mounted onto the flex cable sheet with precise alignment to trace pads of the flex cable sheet one by one.

Slider pads 27 are connected to the corresponding trace pads 25 of flex cable 26 by an SBB machine which has a flex cable sheet conveyer system so that SBB can be finished continuously and automatically.

Figure 7:
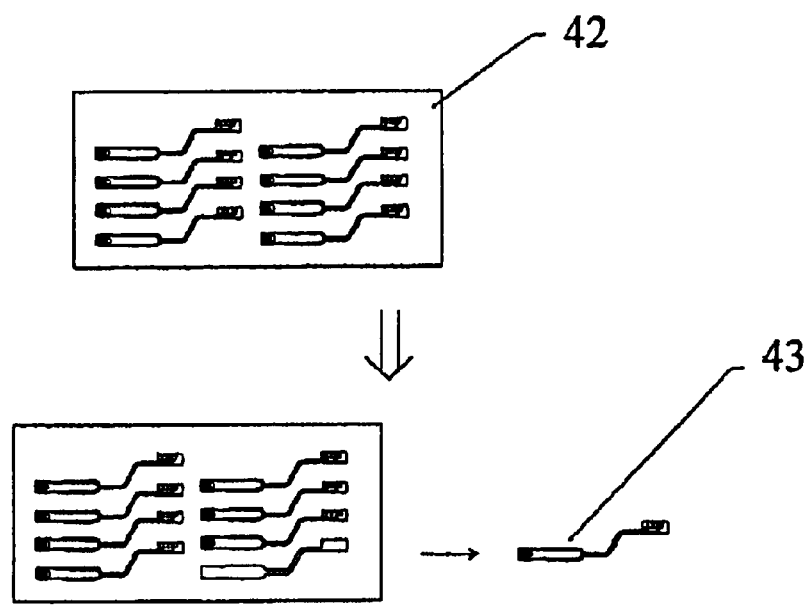
FIG. 7 shows a step of cutting a flex cable with a slider from a sheet.

Thirdly, the flex cable 26 provided with the sliders 24 is cut from the flex cable sheet 42 as shown in FIG. 7.

Figure 8:
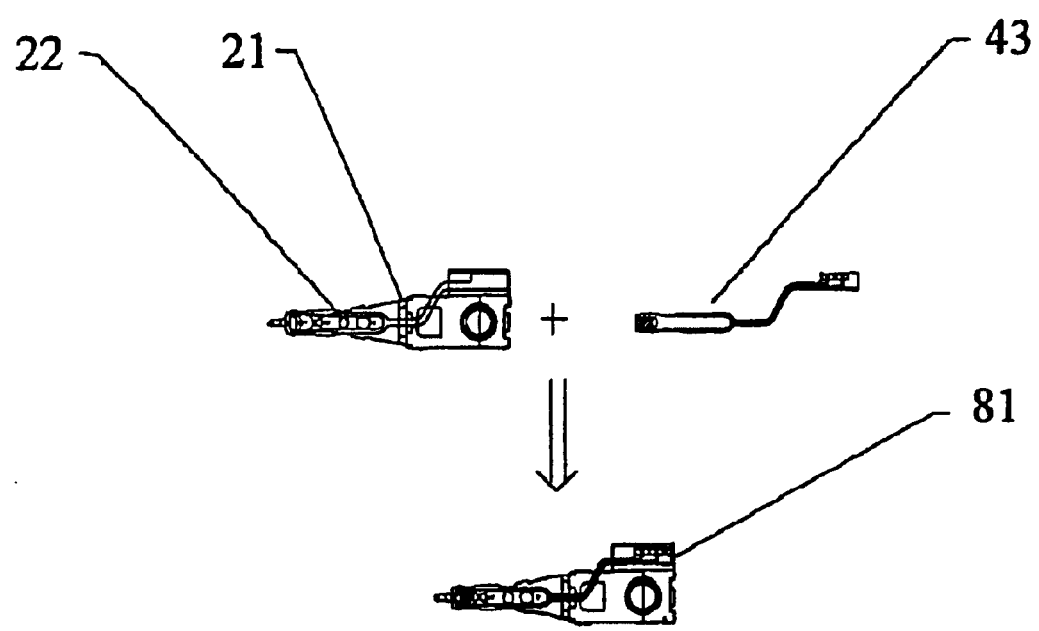
FIG. 8 shows a step mounting a flex cable with a slider onto a suspension.

Next, the flex cable 26 provided with the sliders 24 is mounted onto a suspension 21 by epoxy, and an HGA 81 is finished as shown in FIG. 8.

The SBB method of the present invention changes the bonding process from HGA level to flex cable level, and adds the flex cable sheet transport system to the SBB machine of the present invention.

Since bonding of the SBB method of the present invention is made at flex cable level, the problem of damage of a suspension by clamps and that of suspension pitch/roll change by heating are eliminated automatically.

It becomes easier to make continue bonding on a flex cable sheet than on an HGA fixture, and the capacity of production will be increased significantly by high efficiency.

While the present invention has been described with reference to the particular illustrative embodiment, it is not to be restricted by the embodiment. It is to be appreciated that those skilled in the art can change or modify the embodiments without departing from the scope and spirit of the present invention.

What is claimed is:

1. A SBB bonding method for an HGA by an SBB machine comprising:
    (a) making a flex cable trace pattern onto a flex cable sheet;
    (b) mounting sliders onto the flex cable sheet by epoxy, and aligning trace pads one by one;
    (c) connecting a slider's pad to the corresponding pads of the flex cable trace by bonding;
    (d) cutting the flex cable provided with the sliders from the flex cable sheet;
    (e) mounting the flex cable provided with the sliders onto a suspension, and finishing an HGA.

\* \* \* \* \*

UNITED STATES PATENT AND TRADEMARK OFFICE
CERTIFICATE OF CORRECTION

PATENT NO. : 6,812,429 B2
DATED : November 2, 2004
INVENTOR(S) : Ping Shang

It is certified that error appears in the above-identified patent and that said Letters Patent is hereby corrected as shown below:

Column 1,
Line 9, change "bounding" to -- bonding --.
Line 24, change "intermedallic" to -- intermetallic --.
Line 39, change "bounded" to -- bonded --.

Column 4,
Line 12, change "continue" to -- continuous --.

Signed and Sealed this

Twenty-eighth Day of June, 2005

JON W. DUDAS
*Director of the United States Patent and Trademark Office*